March 28, 1939.  M. R. LIEB ET AL  2,152,551
VALVE
Filed Nov. 24, 1937  3 Sheets-Sheet 1
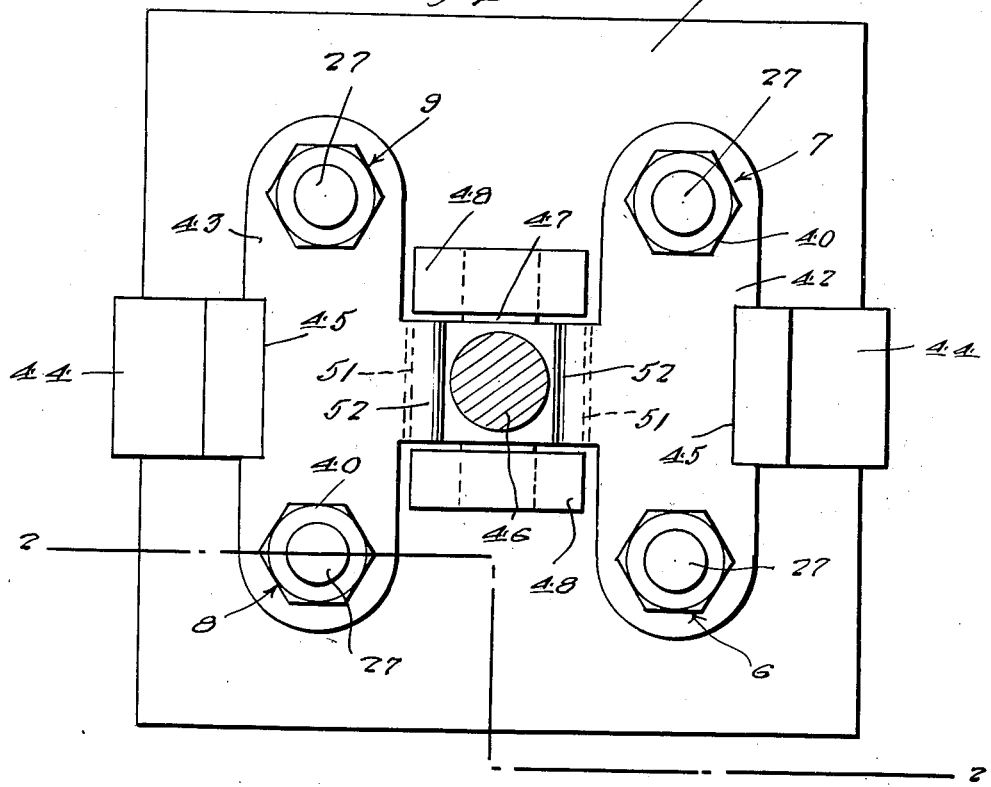
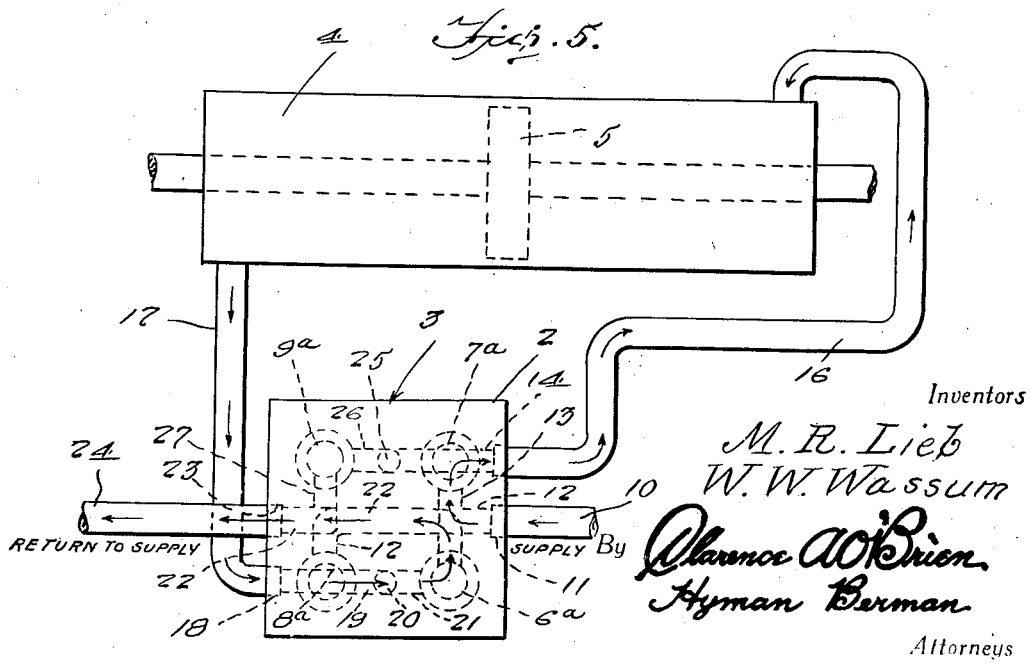
Inventors
M. R. Lieb
W. W. Wassum
By Clarence A. O'Brien
Hyman Berman
Attorneys

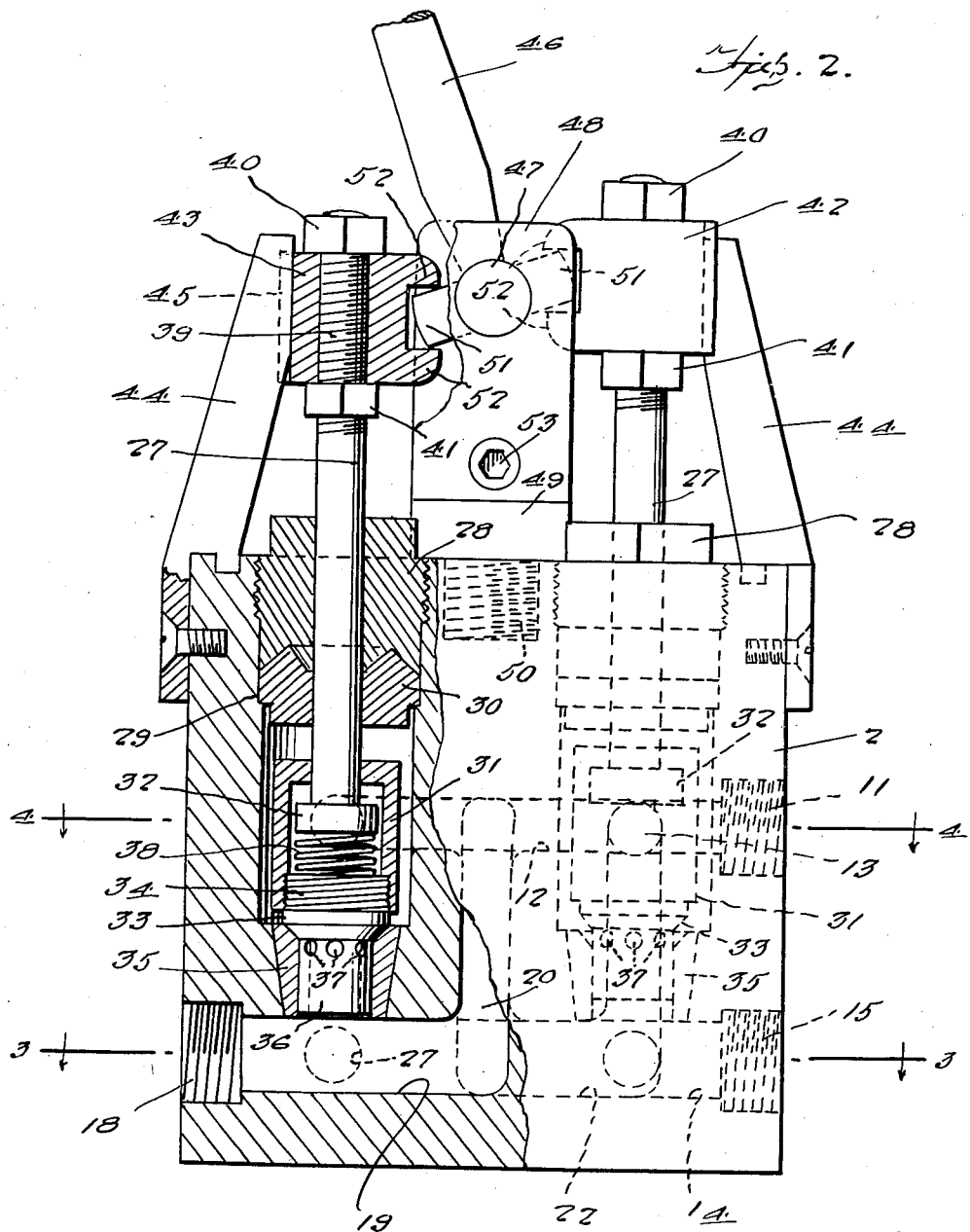

March 28, 1939.  M. R. LIEB ET AL  2,152,551
VALVE
Filed Nov. 24, 1937  3 Sheets-Sheet 3

Inventors
M. R. Lieb
W. W. Wassum
By Clarence A. O'Brien
Hyman Berman
Attorneys

Patented Mar. 28, 1939

2,152,551

UNITED STATES PATENT OFFICE 2,152,551

VALVE

Merril R. Lieb, Allentown, and Walter W. Wassum, Alburtis, Pa.

Application November 24, 1937, Serial No. 176,322

1 Claim. (Cl. 74—104)

This invention relates to valves, and an object of the present invention is the provision of an operating valve for use, particularly, in connection with hydraulic presses for operating the rams thereof.

As is well-known, it is imperative, in hydraulic presses, that the rams thereof go into motion at a given time and that the operation of the rams be positive.

Likewise it is imperative that there be no loss of pressure due to leakage in the operating valve.

An object of the present invention is therefore, further, to provide an operating valve for use with a hydraulic press, and which valve will be substantially self-sealing, silent, positive in its operation, and otherwise meet the requirements of a valve for the purpose intended.

The valve of this application involves certain new and useful improvements over the type of valve shown in our copending application, Serial No. 437,352, filed April 16, 1937, and entitled "Valve".

The present invention with its objects and advantages will be best understood from a study of the following description taken in connection with the accompanying drawings wherein:—

Figure 1 is a top plan view of the valve.

Figure 2 is a sectional view taken substantially on the line 2—2 of Figure 1.

Figure 3:
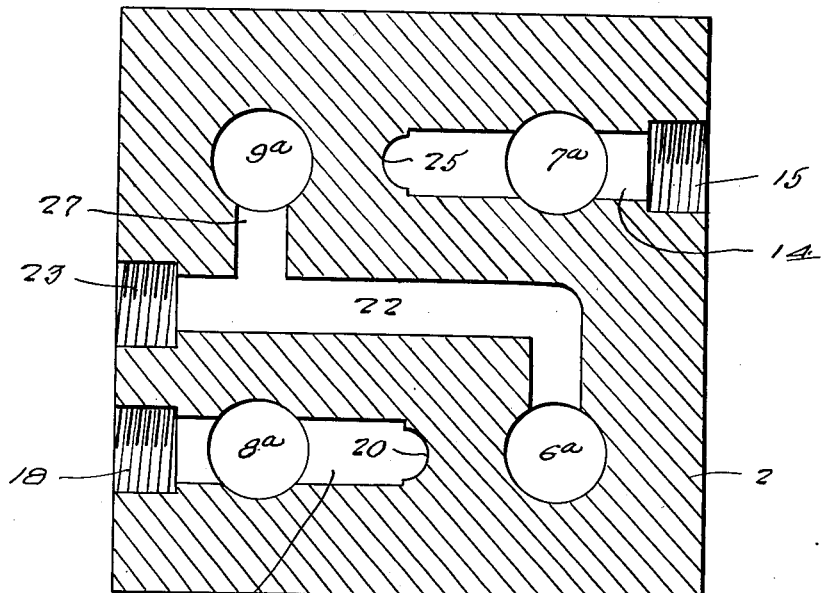
Figure 4:
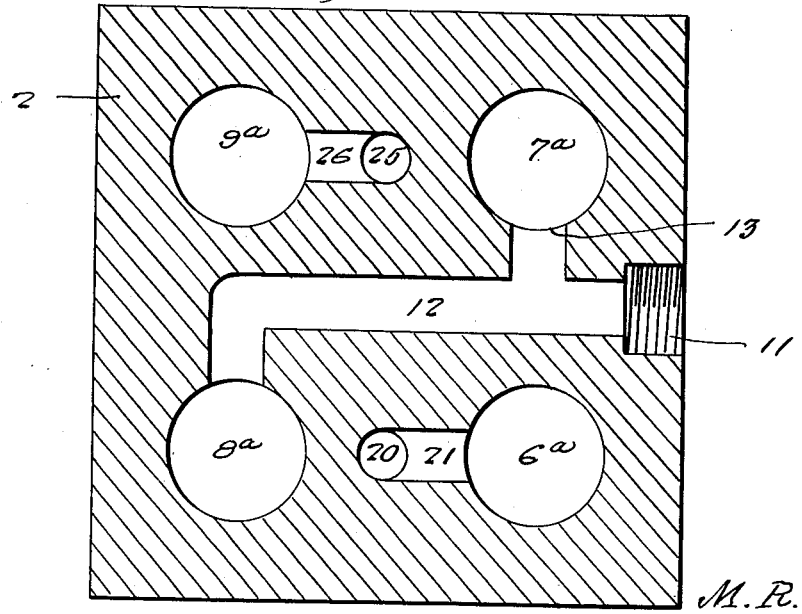

Figures 3 and 4 are horizontal sectional views taken substantially on the lines 3—3 and 4—4 respectively of Figure 2 and with certain parts removed, and Figure 5 is a top plan view showing somewhat diagrammatically the valve, a power cylinder of a hydraulic press and conduit connections between the power cylinder and the valve.

Referring to the drawings more in detail it will be seen that the numeral 4 indicates generally a power cylinder forming a part of a hydraulic press while 5 indicates a piston having a working fit within the cylinder 4 and, in a manner well-known to the art, but not shown in the application, having suitable driving connection with the ram of the press.

An object of the present invention is to provide a valve which will control the flow of fluid to and from the power cylinder 4 for controlling the reciprocatory action of the piston 5 to the end that a positive and efficient operation of the ram of the press will be assured.

The valve of the present invention is indicated generally by the reference numeral 3, and in the embodiment illustrated embodies a casing in the form of a casting 2 accommodating, in the present instance, four valves, which valves are arranged in pairs, the valves of one pair being indicated generally by the reference numerals 6 and 7 respectively, and the valves of the second pair being indicated by the reference numerals 8 and 9 respectively.

To accommodate the valves 6, 7, 8 and 9 there are provided in the casing 2 cylinders 6a, 7a, 8a and 9a as will be clear from a study of Figures 3 and 4.

Since the valves 6 to 9, inclusive, are substantially identical in construction it is believed that a detailed description of one will teach the structure of the other. Thus, referring to Figure 2, it will be seen that each of the valves include a stem 27 having a working fit through a gland 28, packing 29, and a stuffing box ring 30.

The lower end of the stem 27 has a working fit through an opening in the top or crown of a hollow coupling sleeve 31 and at its lowermost end stem 27 is provided with a head 32 that fits loosely within the coupling sleeve 31. A valve disk 33 is provided with a diametrically enlarged threaded pin 34 that threads into the lower end of the coupling sleeve 31 and the disk 33 has a bevelled portion adapted to engage a seat 35 provided therefor in the lower end of the valve cylinder, seat 35 at the upper edge thereof having its wall bevelled so that the conical portion of the valve disk 33 may conformably seat thereagainst.

Also the valve disk 33 has depending therefrom an integral hollow skirt 36, and the skirt 36 where it joins with the disk 33 is provided with a circumferential series of spaced ports 37.

Disposed within the coupling sleeve 31 is a coil spring 38 and one end of the spring 38 bears against the stem head 32 while the other end of the spring bears against the inner end of the valve disk pin 34. Thus it will be seen that there is provided, in effect, a resilient lost motion connection between the valve disk 33 and its stem 27, spring 38 acting to yieldably engage the valve disk 33 with its seat 35. Thus leaking of the valve is effectively guarded against.

Also the stem 27 of each valve has at its upper end a threaded section 39 to receive nuts 40, 41.

Valves 6 and 7 are connected together through the medium of a cross head 42 which at its respective opposite ends is apertured to receive the threaded upper ends of the stems 27 of valves 6 and 7, the nuts 40, 41 associated with the said stems of said valves serving to secure the stems positively to the cross head 42.

In a like manner are the valves 8 and 9 connected together, the cross head connecting the valves 8 and 9 being indicated by the reference numeral 43.

In their movement up and down, or perpendicularly cross heads 42, 43 are guided through the medium of guide brackets 44 that extend upwardly from the casing 2 at opposite sides of said casing, and the upper ends of the guide arms 44 are accommodated by notches 45 provided therefor in the outer side edges of the respective cross heads 42, 43.

For operating the valves so that, for example, as one pair of valves moves upwardly to an unseated position, the other pair of valves will move downwardly to a seating position, there is provided a single operating handle or lever 46. At one end thereof lever 46 is pivoted as at 47 between the upstanding arms 48 of a yoke 49 that has a threaded shank or pin 50 tapped into the top of the casing 2.

At opposite sides of the pivot 47 lever 46 is provided with lugs 51 that engage with pairs of upper and lower ears or lugs 52 provided on the cross heads 42, 43 at the inner side edges of said cross heads and as clearly shown in Figures 1 and 2. Thus it will be seen that by rocking the lever 46 in one direction the valves of one pair will be caused to move downwardly to a seated position while the valves of the second pair will be caused to move upwardly to an unseated position.

To facilitate the threading of the pin 50 of the yoke into the top of the casing 2 or the removal of the yoke one of the arms 48 of the yoke is provided with a conveniently located socket 53 for receiving a suitable tool.

Also in accordance with the present invention the casing 2 at one side thereof is provided with a port 11 into which is tapped one end of a pipe or supply line 10 leading from a suitable source of fluid supply. Leading inwardly from the supply port 11 is a passage 12 which at its inner end connects with the upper portion of the cylinder 8a provided for the valve 8 and passage 12 is also connected by a port or passage 13 with the upper end of the cylinder 7a provided for the valve 7.

On the same side thereof casing 2 below and laterally removed from the port 11 is provided with a port 15 from which extends inwardly of the casing a passage 42 that connects the lower end of the cylinder 7a with the port 15 and tapped into the port 15 is one end of a feed line 16 that leads from the valve casing 2 to the cylinder 4 at the right end of said cylinder.

At the inner end thereof passage 14 connects with a vertical passage 25, and the vertical passage 25 at its upper end is connected through the medium of a port or passage 26 with the upper portion of the cylinder 9a provided for the valve 9.

On the side thereof opposite to the port 11 valve casing 2 is provided with a port 23 into which is tapped one end of a pipe or line 24 that leads from the valve casing 2 back to the source of fluid supply. Extending inwardly from the port 23 is a passage 22 which at its inner end is laterally extended and connects with the lower end of cylinder 6a of valve 6. Passage 22 is also connected through the medium of a port or passage 27 with the lower end of cylinder 9a provided for the valve 9.

Also on the same side thereof as is provided the port 23 casing 2 is provided with a port 28 into which is tapped one end of a pipe or conduit 17 that leads to the valve casing 2 from the left hand end of cylinder 4. Extending inwardly from the port 18 and communicating with the lower end of the valve cylinder 8a is a passage 19. At the inner end thereof passage 19 merges into a vertical passage 20 and the vertical passage 20 at its upper end connects through the medium of a passage 21 with the upper end of the cylinder 6a.

The purpose of such passages and ports as just described will be clear from a detailed description of the operation of the valves.

The operation, utility and advantages of the invention will be apparent from the following:

When it is desired to shift the piston 5 towards the left hand end of cylinder 4 in Figure 5 operating lever 46 is swung to the position shown in Figure 2 so that valves 6 and 7 are raised upwardly to an unseated or open position while valves 8 and 9 are moved downwardly to a seated or closed position. Thus it will be seen that fluid from the source of supply will feed through the supply pipe 10, port 11, passage 12, passage 13, into top of cylinder 7a, passing downwardly through the cylinder 7a to discharge from the cylinder by passing through the ports 37 in the skirt 36 of valve disk 33 forming part of the valve assembly 7. Thus the fluid passes into the passage 14 at the bottom of cylinder 8 and through port 15 and pipe 16 into the cylinder 4 for exerting a pressure on the piston 5 to move the latter towards the left in Figure 5.

It will thus be seen that such fluid in the cylinder 4 and in advance of piston 5 will, upon movement of piston 5 to the left of Figure 5, be forced from the left hand end of the cylinder 4 through the pipe 17, port 18, passage 19 to flow upwardly through the vertical passage 20 and from the passage 20 through the passage 21 into the cylinder 6a. The fluid will flow down through the cylinder 6a to pass out through the open valve 6 into passage 22, flowing through the passage 22 and the port 23 into the return line 24 to be conducted thereby back to the source of fluid supply.

When it is desired to shift the piston 5 to the right in Figure 5 lever 46 is then swung in a clockwise direction from the position shown in Figure 2 to a position reverse to that shown in said Figure 2 whereby valves 6 and 7 will be moved to a closed or seated position while valves 8 and 9 will be moved to a raised or open position. Thus with the valves in this position fluid from the source of supply will feed through the supply pipe 10, port 11, down through the cylinder 8a through the passage 19, port 18, and pipe 17 to enter the cylinded 4 at the left hand end of the cylinder thereby building up a pressure in the cylinder 4 to move the piston 5 to the right in Figure 5.

Obviously as piston 5 moves toward the right in Figure 5 the fluid in cylinder 4 at the right hand end of said cylinder will be forced under pressure from the cylinder through the pipe 16, port 15, pasasge 14, up through the vertical passage 25 to the top of cylinder 9a entering the top of the cylinder through passage 26. The fluid will flow down through the cylinder 9a, out through the open valve and into the passage 27 passing through the passage 27 into passage 22 and through port 23 to the return line 24 back to the source of fluid supply.

Thus it will be seen that when it is desired to shift the piston 5 in one direction, viz; to the left in Figure 5 valves 6 and 7 are open while valves 8 and 9 are closed; while on the other hand when it is desired to shift piston 5 in a reverse direction, or in other words to the right in Figure 5, valves 8 and 9 are open while valves 6 and 7 are closed.

It will be further appreciated that with a valve assembly of this character the flow of fluid may be readily controlled in a manner to control the reciprocating action of the power piston to the end that the working of the piston will be smooth and positive with a resultant smooth and positive operation of the ram of the hydraulic press.

It is thought that the invention will now be thoroughly understood by those skilled in the art without a more detailed description.

Having thus described the invention what is claimed as new is:

In a valve structure including a body having valve stems passing through its upper portion, a yoke rising from the top of the body between the stems, a horizontal shaft journaled in the yoke, oppositely arranged lugs projecting from the shaft located between the arms of the yoke, upwardly converging arms connected to opposite sides of the body and each arm having a straight vertically arranged inner edge at its upper portion, a pair of cross heads, one connected with a stem at one side of the yoke, and the other with a stem at the opposite side of the yoke, each cross head having a vertically arranged groove in its outer edge in which said upper portion of an arm fits and the inner edge of each cross head having a horizontal groove therein for receiving a lug and a handle connected with the shaft for rocking the same for causing the lugs to alternately reciprocate the cross heads.

WALTER W. WASSUM.
MERRIL R. LIEB.